Aug. 28, 1945.    L. L. REIDENBACH    2,383,683
CLAMPING DEVICE
Filed May 3, 1943

Inventor
Ledger L. Reidenbach.
By
E. V. Hardway.
Attorney

Patented Aug. 28, 1945

2,383,683

UNITED STATES PATENT OFFICE 2,383,683

CLAMPING DEVICE

Ledger L. Reidenbach, Houston, Tex., assignor to Rosa Suhm, Harris County, Tex.

Application May 3, 1943, Serial No. 485,525

1 Claim. (Cl. 24—221)

This invention relates to a clamping device and has more particular relation to a novel type of clamp member embodied in the device.

An object of the invention is to provide a clamping device by means of which two adjacent parts may be securely clamped together in such manner that the removable part will be firmly held in position but may be easily and quickly released for removal.

In the manufacture of aeroplanes it is desirable that certain parts, particularly fuselage parts, be removable so as to gain access to the interior for repairs and other similar purposes. It is one of the objects of the present invention to provide, in a clamping device for this purpose, a novel type of clamp member which is of such construction that it can be more easily manufactured and will require less material than clamp members now in use for a similar purpose.

While the clamping device herein described has been particularly designed for use in aeroplane fuselage construction it is capable of general use for securing two parts together where it is desirable that one of the parts be releasable and removable from the other.

With the above and other objects in view the invention has particular relation to certain novel features of construction and use, an example of which is given in this specification and illustrated in the accompanying drawing wherein.

Figure 1:
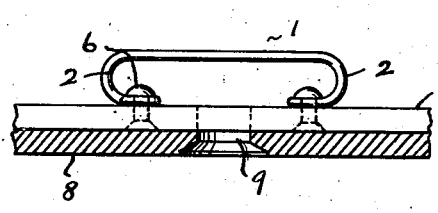
Figure 1 shows a side view of the clamp member secured to one of the parts.

Referring now more particularly to the drawing wherein like numerals of reference designate the same parts in each of the figures, the numeral 1 designates the clamp member as a whole and which is formed of a rod of metal, or other suitable material. This clamp member is formed with the U-shaped ends 2, 2 which terminate in the eyes 3, 3. The U-shaped ends 2, 2 lie in substantially a common plane and the eyes 3, 3 lie in substantially a common plane which is approximately perpendicular to the plane of the ends 2.

Figure 6:
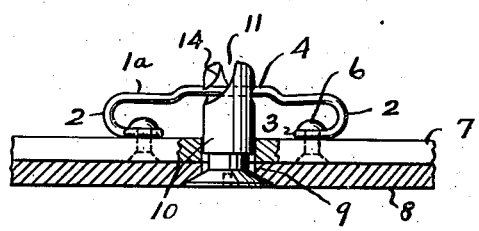
Figure 3:
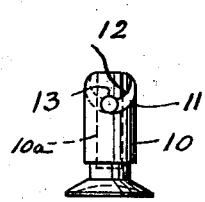
Figure 3 shows a side view of the clamp bolt.
Figure 7:
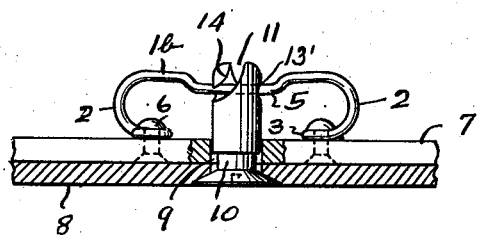
Figure 4:
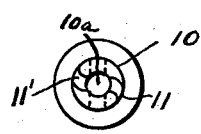
Figure 4 shows an end view thereof.

The construction of the clamp members 1a, 1b shown in Figures 6 and 7 is substantially the same as that of the clamp member 1 shown in Figure 1 excepting that the U-shaped ends of the clamp member 1a are curved on a smaller arc and the U-shaped ends of the clamp member 1b are curved on a greater arc than the arc of the ends 2 of the clamp member shown in Figure 1. Accordingly the mid portion 4 of the clamp member 1a will be offset outwardly as shown in Figure 6 and the mid portion 5 of the clamp member 1b will be offset inwardly as shown in Figure 7. Consequently the U-shaped ends 2 of the clamp member 1a will have less flexibility and the U-shaped ends 2 of the clamp member 1b will have more flexibility than the U-shaped ends of the clamp member 1; so that a wide range of selection is provided depending upon the requirements.

Figure 2:
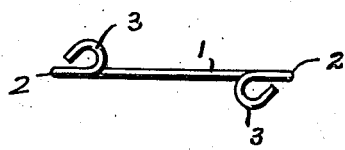
Figure 2 shows a bottom view thereof.

It will be noted from an inspection of Figure 2 that the eyes 3, 3 are offset laterally on opposite sides of the plane of the U-shaped ends 2 to thus provide a maximum supporting base.

In the illustration shown in the drawing the part 7 designates a fixed part, or frame work, to which the removable panel or other part 8 is to be secured. These parts 7 and 8 have the required number of registering openings as 9.

Figure 5:
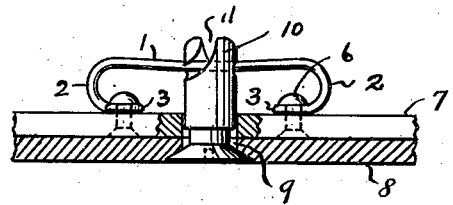
Figure 5 shows a side view of the clamping device securing two parts together and Figures 6 and 7 show side views showing other embodiments of the clamp member.

The clamp member is secured in centered position over the opening by means of set screws, or rivets, as 6, which are fitted through the eyes 3 as shown. The numeral 10 designates a clamp bolt having an enlarged head on one end and a deep socket 10a in the other end. This last mentioned end has the oppositely arranged correspondingly spiralled slots 11, 11' which terminate in the shallow seats 13, 13'. The sides of the slots 11, 11', toward the free end of the bolt, form the spiralled cam faces 12, 14. The clamp bolt 10 may be fitted through the opening 9 in position so that the clamp member will align with the outer ends of the slots 11, 11', with the head of the bolt countersunk into the part 8 and with the clamp member initially in the outer ends of said slots. The bolt 10 may then be turned to the right or in a clockwise direction. This may be done by a screw driver or in any other selected way. As the bolt is turned the cams 12, 14 will place the clamp member under tension, as indicated in Figure 5 and said clamp member will finally be seated in the seats 13 so as to securely hold the parts locked together.

When it is desired to release the clamping device to remove the panel or part 8 the bolt 10 may be turned to the left so as to unseat the clamp member and the bolt may then be readily withdrawn. It is contemplated that the required number of clamping devices will be arranged around the margin of the panel, or other removable part, to securely hold it in place.

It is obvious that the removable part will thus be held in place under tension, and vibration and relative movement of the parts 7 and 8 will thus be eliminated.

What I claim is:

In a clamping device, a clamp member comprising a rod having a transverse portion and whose ends are correspondingly overturned in a substantially common plane the midsection of the transverse portion being offset, in said plane, relative to the adjacent portions thereof, said overturned ends being U-shaped and terminating in eyes in substantially the same plane which is approximately perpendicular to said common plane, said eyes being turned outwardly in opposite directions and being located in opposite sides of the plane of said U-shaped ends.

LEDGER L. REIDENBACH.